United States Patent
Terry et al.

(10) Patent No.: US 7,578,645 B2
(45) Date of Patent: Aug. 25, 2009

(54) REMOVEABLE TRUCK BED TIE-DOWN DEVICE

(76) Inventors: Dave Terry, 515 Hill Dr., Robertsville, MO (US) 63072; Todd Russom, 400 Glan Tae Dr., Manchester, MO (US) 63011; Rick Marler, 143 Forsythia, Festus, MO (US) 63028

( * ) Notice: Subject to any disclaimer, the term of this patent is extended or adjusted under 35 U.S.C. 154(b) by 417 days.

(21) Appl. No.: 11/349,363

(22) Filed: Feb. 7, 2006

(65) Prior Publication Data

US 2006/0177283 A1    Aug. 10, 2006

Related U.S. Application Data

(60) Provisional application No. 60/650,361, filed on Feb. 7, 2005.

(51) Int. Cl.
*B60P 7/08* (2006.01)
(52) U.S. Cl. ................................ 410/106; 410/101
(58) Field of Classification Search ............ 410/97, 410/104, 105, 106, 110, 111, 116, 101; 24/265 CD, 24/115 K; 248/499
See application file for complete search history.

(56) References Cited

U.S. PATENT DOCUMENTS

| | | | |
|---|---|---|---|
| 1,516,489 A | 11/1924 | Barton |
| 4,850,770 A | 7/1989 | Millar, Jr. |
| 4,953,820 A | 9/1990 | Yoder |
| 5,416,956 A | 5/1995 | Rubin |
| 5,443,341 A | 8/1995 | Hamilton |
| 5,560,576 A | * | 10/1996 | Cargill |
| 6,039,520 A | 3/2000 | Cheng |
| 6,129,490 A | 10/2000 | Erskine et al. |
| 6,196,777 B1 | 3/2001 | Price |
| 6,350,089 B1 | 2/2002 | Tekavec |
| 6,604,898 B2 | 8/2003 | Price |

* cited by examiner

*Primary Examiner*—Stephen Gordon
(74) *Attorney, Agent, or Firm*—Grace J. Fishel

(57) ABSTRACT

A tie-down device that removeably secures to almost any point along a side rail of a truck bed without the aid of tools and without modifying the truck bed. Security members can removeably attach to the tie-down device to secure items within the truck bed for safe transport. The tie-down device includes a first member and a second member operatively connected by a fastener to clamp the tie-down device against respective side rail outer surface and side rail inner surface with a frictional connection.

9 Claims, 4 Drawing Sheets

REMOVEABLE TRUCK BED TIE-DOWN DEVICE

CROSS-REFERENCE TO RELATED APPLICATIONS

This application is related to U.S. Provisional Patent Application No. 60/650,361 filed Feb. 7, 2005 from which priority is claimed, and is hereby incorporated by reference.

STATEMENT REGARDING FEDERALLY SPONSORED RESEARCH

Not Applicable.

BACKGROUND OF THE INVENTION

The present invention is relates to accessories for truck beds, and more particularly to a tie-down device for removeably securing to side rails.

Many devices are known for securing items within a truck bed. Typically, tie-down devices are permanently located at various locations around the truck bed to provide connection points for ropes, chains, straps, and other securing means. For example, original equipment manufactures offer tie-down devices which are integrally molded or welded to the truck side rails. Alternatively, tie-down devices can be installed aftermarket, which usually involves drilling holes or other major modifications to the truck bed, which can make the truck susceptible to rust.

However, these types of devices have many disadvantages. For one, they are typically very expensive to purchase and install. Also, installation requires tools and making major modifications to the truck bed. In addition, they are permanently fixed in pre-determined positions and cannot be easily moved to accommodate other positions.

Other removable or adjustable tie-down devices have also been proposed. However, most are not convenient to use and still require tools to install and remove. Some have a tendency to scratch, dent, and in general cause damage to the truck bed during installation and use. None of the proposed devices have provided an affordable tie-down device that overcomes all these disadvantages.

Therefore, therefore there is a long felt need for an affordable tie-down device that is there convenient and easy to use without the use of tools and does not damage the truck bed during installation or regular use.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
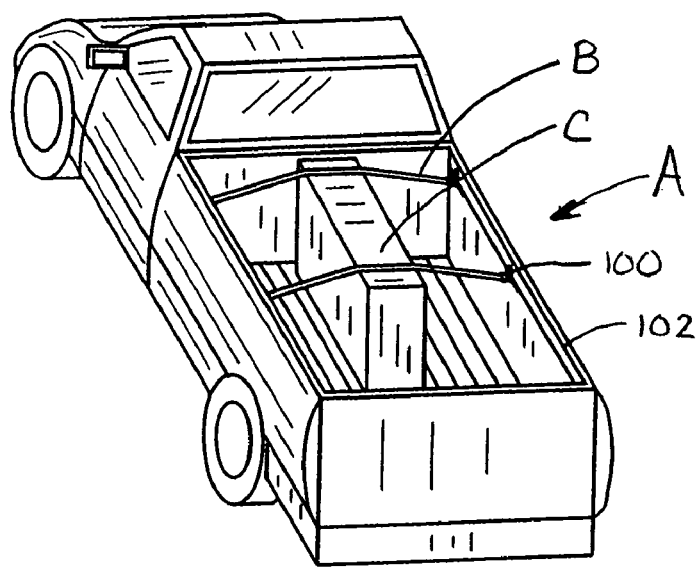
FIG. 1 is a perspective view of a plurality of tie-down devices secured to a truck bed in accordance with and embodying the present invention.
Figure 2:
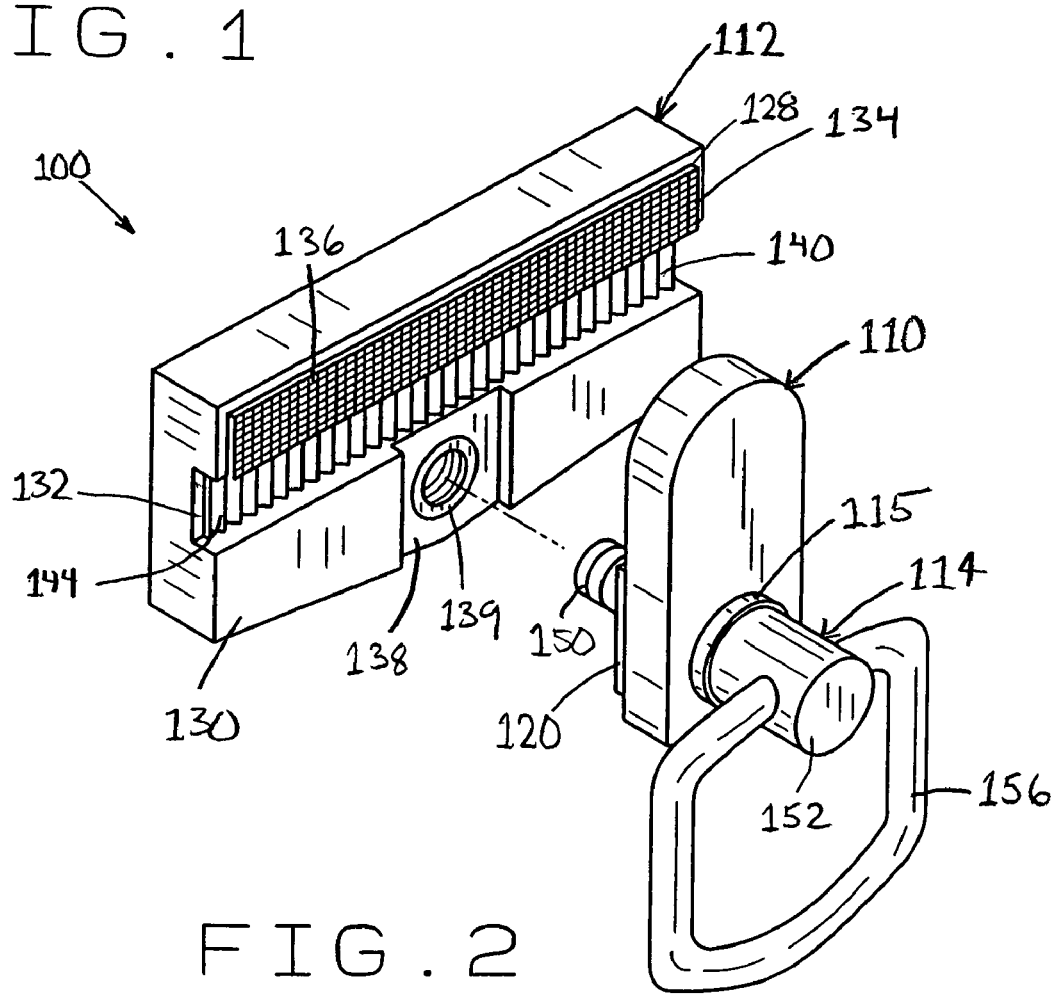
FIG. 2 is a perspective view of the tie-down device in accordance with and embodying the present invention.
Figure 3:
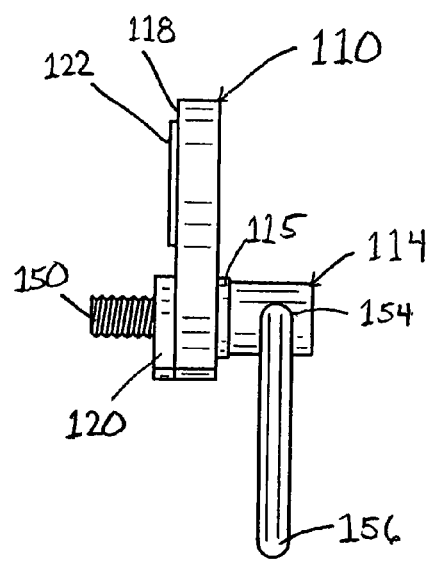
FIG. 3 is a side view of a first member of the tie-down device.
Figure 4:
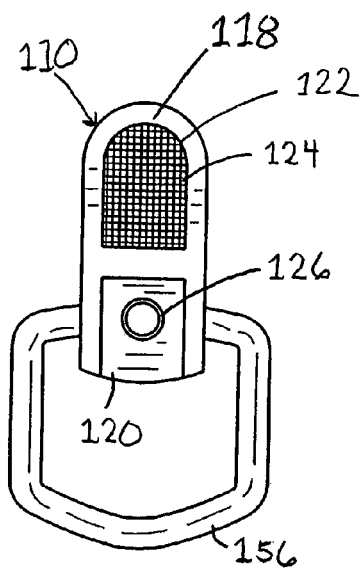
FIG. 4 is a front view of the first member of the tie-down device.
Figure 5:
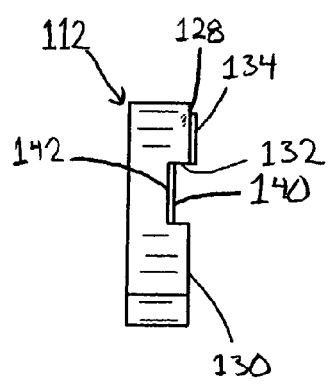
FIG. 5 is a side view of a second member of the tie-down device.
Figure 6:
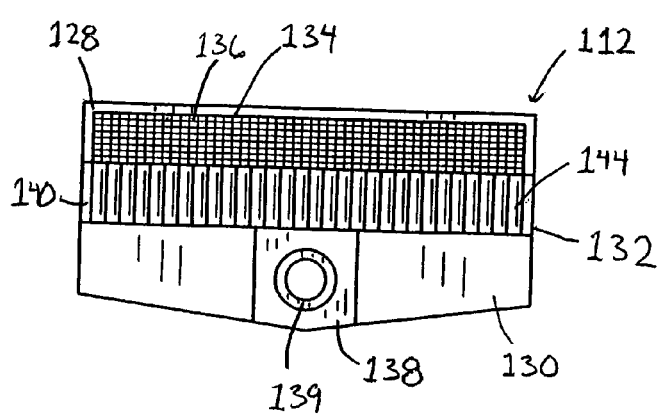
FIG. 6 is a front view of the second member of the tie-down device.
Figure 7:
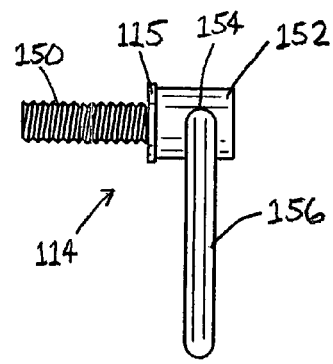
FIG. 7 is a side view of a fastener.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in FIGS. 1-12, an embodiment of the present invention, generally referred to as a tie-down device 100, removeably secures to almost any point along a side rail 102 of a truck bed "A" without the aid of tools and without modifying the truck bed "A" in any way. Once installed, securing members "B", such as ropes, straps, cables, chains, or the like, can removeably attach to the tie-down device 100 to secure items "C" within the truck bed "A" for safe transport. As shown, in FIG. 1, a plurality of tie-down devices 100 can be secured at various locations along both side rails 102. A plurality of securing members "B" can attach between the tie-down devices to secure one or more items within the truck bed "A".

Figure 8:
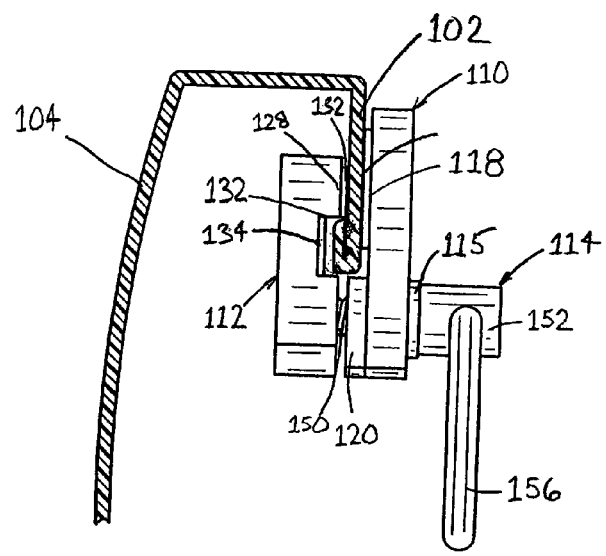
FIG. 8 is a partial sectional view of the tie-down device secured to a side rail.

As shown in FIGS. 1 and 8, a typical truck bed "A" has side rails 102 along each side, which extend downwardly in a substantially vertical orientation from the side wall 104. To avoid leaving any sharp surfaces exposed, the side wall bottom edge is folded upwards to abut a side wall inner surface 106, thereby creating a raised edge 108 (FIG. 8). While the depicted embodiment includes a side rail 102 with raised edge 108, those skilled in the art will recognize the side rails in some truck beds do not include a raised edge.

The tie-down device 100 includes a first member 110 and a second member 112 operatively connected by a fastener 114 to clamp the tie-down device 100 against respective side rail outer surface 116 and side rail inner surface 106 (FIG. 8).

The first member 110 (FIGS. 3-4) is generally rectangular in shape with a planar engagement surface 118 at one end to secure against the side rail outer surface 116 and a raised portion 120 at the opposite end. The engagement surface 118 includes a protective surface 122 that enhances frictional contact and prevents damage to the side rail outer surface 116 from abrasion and the like during contact with the first member 110. The protective surface 122 can be made from any appropriate material, preferably a rubber or synthetic material. In the depicted embodiment, the protective surface 122 defines a plurality of protrusions 124 arranged in a grid pattern. A clearance hole 126 for the fastener 114 extends through the first member 110, including the raised portion 120.

The second member 112 (FIGS. 5-6) is generally rectangular in shape with a planar upper surface 128 to secure against the side rail inner surface 106 and a lower surface 130, which are separated by a channel 132 for receiving the side rail raised edge 108. The upper surface 128 includes a protective surface 134 that enhances frictional contact and prevents damage to the side rail inner surface 106 from abrasion and the like during contact with the second member 112. The protective surface 134 can be made from any appropriate material, preferably a rubber or synthetic material. In the depicted embodiment, the protective surface 134 defines a plurality of protrusions 136 arranged in a grid pattern. The lower surface 130 includes a recess 138 for mating with the raised portion 120 of the first member 110. A threaded insert 139 extends through the lower surface 130 for engaging the fastener 114. The entire surface of the channel 132 includes a protective surface 140. Specifically, the protective surface 140 along the channel base 142 defines a plurality of substantially vertical ridges 144. For proper operation of the device 100, the depth of the channel 132 should be greater than the height of the side rail raised edge 108, so that the first and second members 110 and 112 can properly clamp against the side rail 102.

Figure 9:
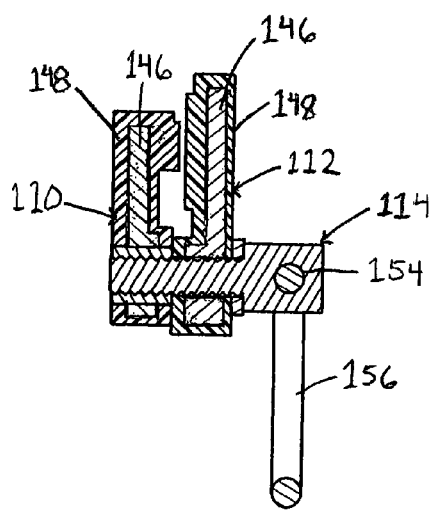
FIG. 9 is a sectional view of the tie-down device.
Figure 10:
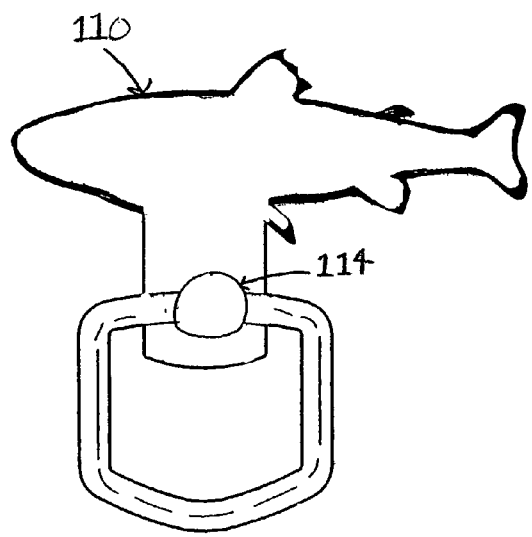
FIG. 10 is a back view of an alternate embodiment of the first member shaped as a fish.

As shown in FIG. 9, the first and second members 110 and 112 contain a metal core 146, preferably steel, but it can also be aluminum, and the like, encapsulated by a non-metallic housing 148, preferably nylon but it can also be plastic, rubber, composite materials, and the like. The metal core 146 provides the first and second members 110 and 112 with desirable structural characteristics, such as the ability to handle high tensile and compression loads. The non-metallic housing 148 provides the first and second members 110 and 112 with other desirable characteristics that allow it to withstand the outdoor elements, such as being corrosion resistance and water proof. The non-metallic housing 148 can also provide desirable aesthetic features, such as color and texture.

The fastener 114 (FIG. 7) includes a threaded shaft 150 terminating at a head 152. The head 152 includes a clearance hole 154 for pivotally attaching a retaining member, preferably a D-ring 156. The fastener 114 and retaining member 156 are made from a suitable metal, preferably stainless steel, but can also be brass, iron, zinc-plated steel, chrome plated steel, or the like. Although the retaining member is preferably a pivoting D-ring, the retaining member can be a fixed loop, a hook, a plate, or any other similar device.

To assemble and operate the tie-down device 100, the fastener 114 inserts through a washer 115 and the first member clearance hole 126 with engages the second member threaded insert 139. In this position, the first member 110 is generally parallel with the second member 112. The fastener 114 can be turned back and forth to move the first member 110 and second member 112 towards and away from each other, thereby clamping and releasing the device 100. The device 100 is placed along the side rail 102 at a desired location with the first member engagement surface 118 abutting the side rail outer surface 116, the second member upper surface 128 abutting the side rail inner surface 106, and the raised edge 108 residing within the channel 132 (FIG. 8). In addition, the first member raised portion 120 mates with the second member recess 138 to properly orient the first member 110 relative to the second member 112. The fastener 114 is turned until the first member 110 and second member 112 clamp against respective side rail outer surface 116 and side rail inner surface 106. One only needs to hand-tighten the tie-down device 110 and no tools are necessary. When desired, the fastener 114 can easily be loosened and the tie-down device 110 moved to a different location along either side rail 102. It is not necessary to completely remove the tie-down device 100 from the side rail 102 for location adjustment. When the fastener is slightly loosened, the tie-down device can slide along the side rail 102 without being completely removed. Once the tie-down device 100 is secured, securing members "B" can be attached to the retaining member 156 and used to secure items within the truck bed "A".

During operation, the securing members "B" can place large tensile forces on tie-down device 10. For that reason, tie-down device 100 uses only extensive planar surfaces to contact the side rail 102 so that the forces applied during operation are spread over a larger surface area. There are no points or edges in contact with the side rail 102 that could cause damage due to concentrated forces applied over a small surface area. This allows the tie-down device 100 the ability to handle larger tensile forces without damage to the side rail. In the present invention, the first member engagement surface 118 is approximately ¾" by ¾" and the second member upper surface 128 is approximately 1¾" by ⅜". It is believed by the inventors that the tie-down device 100 with this surface area is capable of handling up to approximately 500 pounds of tensile force by the securing member "B" without damaging the side rail 102. However, those skilled in the art will recognize that various other sizes can be used.

Figure 11:
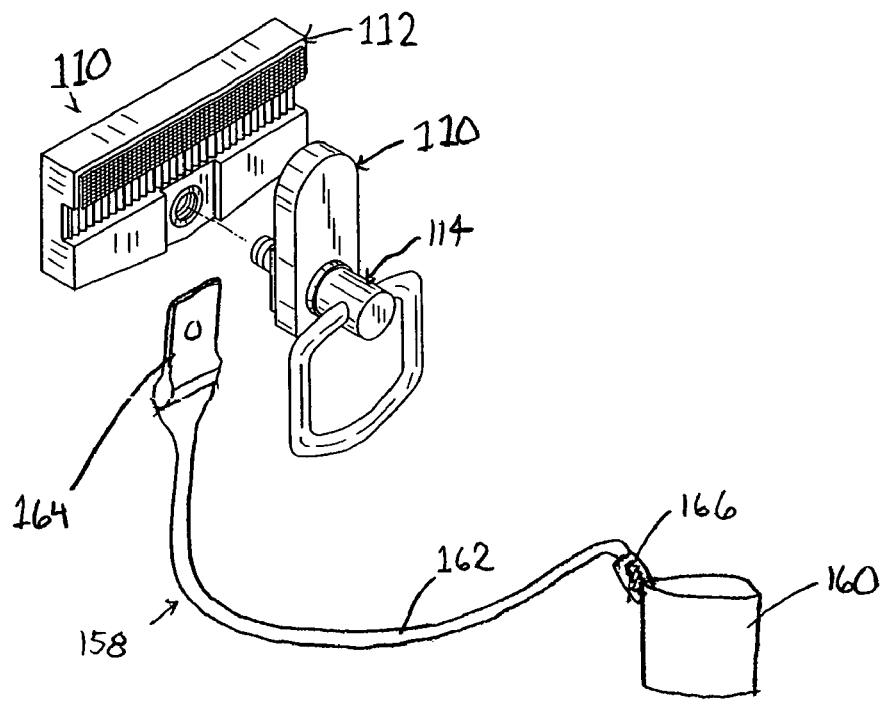
FIG. 11 is a perspective view of an alternate embodiment the tie-down device having a electrostatic control member.
Figure 12:
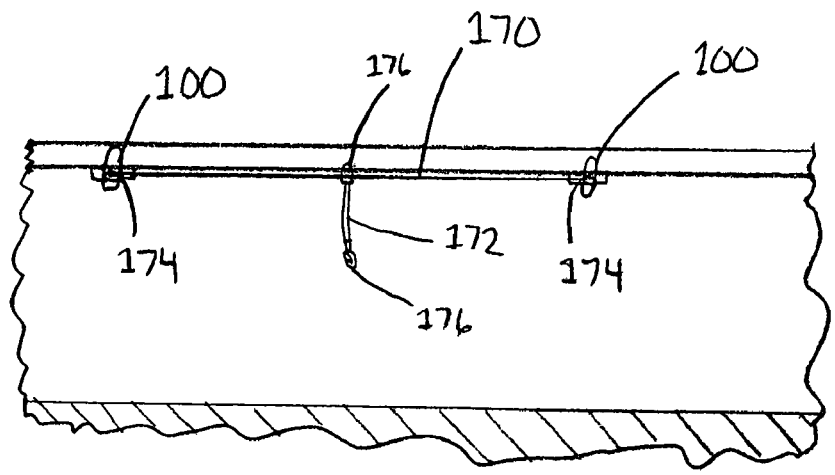
FIG. 12 is an side elevational view of an alternate embodiment of a pair of tie-down devices associated with connecting member and a leash member.

Many variations of the tie-down device 100 can be made without departing from the scope of the invention. Several alternate embodiments of the tie-down device 100 are shown in FIGS. 11-12. For example, an alternate embodiment depicted in FIG. 10, the first member 110 can be embodied in various personalized shapes, such as a fish, deer head, sports logos, or the like.

In yet another embodiment depicted in FIG. 11, the tie-down device 100 includes a electrostatic control member 158 to attach to an item 160 for grounding within the truck bed. The control member 158 is a metal cable 162 with a connector 164 at one end for securing to the fastener 114 and a releasable clip 166, preferably an alligator clip, for releasably securing to item 160. The connector 164 is a flat metallic member having a clearance hole 168 for receiving the fastener 114. When the tie-down device 100 is secured to the side rail 102, the connector 164 contacts the side rail 102 and the clip 166 is attached to the item 160. Once secured, the control member serves as an electrical conduit to transfer any static electricity from the item 160 to the truck. This will prevent any dangerous sparks that can be caused from the presence of static electricity within the truck bed.

In another alternate embodiment depicted in FIG. 12, two tie-down devices 100 are connected by a connecting cable 170 and a leash member 172 for securing a dog or other animal. The connecting cable 170, preferably a nylon cable, includes releasable connectors 174 at each end to releasably attach tautly between the tie-down devices retaining members 156. A leash member 172, preferably a nylon cable, includes a releasable connectors 176 at each end for slidably securing to the connecting cable with one end and securing to a dog collar at the other end. In this way the leash can slide freely along the connecting cable to allow the dog a small range of motion within the truck bed.

Changes can be made in the above constructions without departing from the scope of the invention. It is intended that all matter contained in the above description or shown in the accompanying drawings shall be interpreted as illustrative and not in a limiting sense.

What is claimed is:

1. A tie-down device for a truck bed having a side wall with a bend at the top forming a vertical downward flange with a side rail outer surface and a side rail inner surface, said flange having a lower edge which is folded upwards to abut the side rail inner surface, said tie-down comprising:
    a first member having a planar engagement surface with a first protective surface capable of being secured to the side rail outer surface, wherein substantially all of the first protective surface is in contact with the side rail outer surface,
    a second member having a planar upper surface with a second protective surface substantially parallel with the first protective surface and being capable of being secured to the side rail inner surface, wherein substantially all of the second protective surface is in contact with the side rail inner surface,
    said second member further comprising a planar lower surface and an elongated channel between said planar upper and lower surfaces capable of receiving the folded lower edge of the flange, said planar lower surface having a recess;
    said first member further having a raised portion capable of mating with the recess in the second member;
    a fastener extending through the first member and removably coupled with the second member with the raised portion of the first member received in the recess of the second member and with the folded lower edge of the flange received in the channel of the second member so that the downward flange is clampable between the first member and second member at substantially any location along the downward flange, said fastener having a retaining member for removably attached securing members.

2. The tie-down device of claim 1, wherein the first member comprises a metallic core encapsulated by a non-metallic housing.

3. The tie-down device of claim 1, wherein the second member comprises a metallic core encapsulated by a non-metallic housing.

4. The tie-down device of claim 1, wherein the tie-down device secures to the side wall without the use of tools.

5. The tie-down device of claim 1, wherein the tie-down device secures to the side wall without modifying the side wall.

6. A tie-down device of claim 1, wherein the fastener further comprises:
    a threaded shaft; and
    a head having hole for pivotally attaching the retaining member.

7. The tie-down device of claim 6, wherein the second member further comprises a threaded insert for engagement with the threaded shaft of the fastener.

8. The tie-down device of claim 1, wherein the first and second protective surfaces prevent damage and enhance frictional contact with the side rail outer surface and the side rail inner surface, respectively.

9. The tie-down device of claim 1, wherein the first member defines a personalized shape.

* * * * *

UNITED STATES PATENT AND TRADEMARK OFFICE
CERTIFICATE OF CORRECTION

PATENT NO. : 7,578,645 B2  Page 1 of 1
APPLICATION NO. : 11/349363
DATED : August 25, 2009
INVENTOR(S) : Terry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this

Seventh Day of September, 2010

David J. Kappos
*Director of the United States Patent and Trademark Office*